United States Patent [19]

Morris

[11] Patent Number: 5,813,638
[45] Date of Patent: *Sep. 29, 1998

[54] MIXING BOWL SUPPORTING ASSEMBLY

[75] Inventor: David F. Morris, 3811 Cantebury Rd., Apt. 503, Baltimore, Md. 21218

[73] Assignee: David F. Morris, Baltimore, Md.

[ * ] Notice: The term of this patent shall not extend beyond the expiration date of Pat. No. 5,634,617.

[21] Appl. No.: 852,576

[22] Filed: May 7, 1997

Related U.S. Application Data

[63] Continuation-in-part of Ser. No. 405,760, Mar. 20, 1995, Pat. No. 5,639,617.

[51] Int. Cl.⁶ .................................................. A47G 23/02
[52] U.S. Cl. ...................... 248/152; 248/345.1; 248/687; 220/574; 220/632; 220/636
[58] Field of Search .................... 248/146, 152, 248/174, 176, 310, 315, 346.01, 346.11, 345.1, 346.03, 346.06, 362, 687; 220/574, 632; 211/14, 15; 206/315.9, 315.91; 403/242, 265, 266, 267, 325

[56] References Cited

U.S. PATENT DOCUMENTS

| | | | |
|---|---|---|---|
| D. 110,902 | 8/1938 | Loesch | D7/558 |
| D. 138,395 | 8/1944 | Howard | D7/338 |
| D. 192,226 | 2/1962 | Curtis . | |
| D. 195,475 | 6/1963 | Swett . | |
| D. 217,782 | 6/1970 | Beckman . | |
| D. 221,175 | 7/1971 | Beckman . | |
| D. 232,903 | 9/1974 | Beckman . | |
| D. 236,184 | 8/1975 | Greger . | |
| D. 237,151 | 10/1975 | Taylor . | |
| 255,165 | 3/1882 | Hale | 220/636 |
| 310,639 | 1/1885 | Beaham | 126/376 |
| D. 334,874 | 4/1993 | Mealey . | |
| D. 342,969 | 1/1994 | Edwards . | |
| 419,169 | 1/1890 | Herrick . | |
| 516,073 | 3/1894 | Booth | 126/361 |
| 673,965 | 5/1901 | Ringenberg . | |
| 780,910 | 1/1905 | Peters | 220/628 |
| 881,199 | 3/1908 | Palmer . | |
| 1,381,536 | 6/1921 | Bohlman | 248/152 |
| 1,657,664 | 1/1928 | Dexter | 206/423 |
| 1,755,603 | 4/1930 | Kass . | |
| 1,890,000 | 12/1932 | Oakley | 248/687 |
| 1,892,140 | 12/1932 | Fogler . | |
| 1,892,142 | 12/1932 | Oakley . | |
| 2,018,271 | 10/1935 | Lewis | 220/632 |
| 2,063,328 | 12/1936 | Morcom | 248/152 |
| 2,083,299 | 6/1937 | Hunter . | |
| 2,142,019 | 12/1938 | Warner . | |
| 2,177,170 | 10/1939 | Chapel . | |
| 2,189,369 | 2/1940 | Samuels | 248/687 |
| 2,495,315 | 1/1950 | Carr . | |

(List continued on next page.)

FOREIGN PATENT DOCUMENTS

| | | |
|---|---|---|
| 0384197 | 8/1990 | European Pat. Off. . |
| 10506 | 1/1880 | Germany . |
| 13786 | 6/1904 | United Kingdom . |

*Primary Examiner*—Leslie A. Braun
*Assistant Examiner*—Tan Le
*Attorney, Agent, or Firm*—Pillsbury, Madison & Sutro LLP Cushman Darby & Cushman Intellectual Property Group

[57] ABSTRACT

A supporting assembly for a mixing bowl is provided including a support having first and second opposing edges and at least one open end defining an interior space. First and second holding members are provided, each holding member covering at least a portion of an associated edge of the support. The holding members are constructed and arranged such that when the supporting assembly is disposed with the first holding member in contact with a planar surface and a mixing bowl is at least partially disposed in the interior space with the second holding member contacting a peripheral surface of the mixing bowl, friction between the mixing bowl and the second holding member and between the planar surface and the first holding member holds the bowl stationary with respect to the planar surface when contents of the mixing bowl are mixed.

16 Claims, 3 Drawing Sheets

U.S. PATENT DOCUMENTS

| | | | |
|---|---|---|---|
| 2,565,793 | 8/1951 | Weismantel . | |
| 2,748,952 | 1/1956 | Fleit et al. | 211/74 |
| 2,905,351 | 9/1959 | Lerner | 215/376 |
| 3,028,702 | 4/1962 | St. Cyr | 215/395 |
| 3,094,258 | 6/1963 | Punke . | |
| 3,229,949 | 1/1966 | Chaconas . | |
| 3,233,644 | 2/1966 | Bono | 220/9.1 |
| 3,327,893 | 6/1967 | Graves | 220/632 |
| 3,419,240 | 12/1968 | Santic | 220/632 |
| 3,606,074 | 9/1971 | Hayes . | |
| 4,109,887 | 8/1978 | Wakeland, Jr. | 248/345.1 |
| 4,305,559 | 12/1981 | Jackson . | |
| 4,582,739 | 4/1986 | Givens . | |
| 4,589,619 | 5/1986 | Forbes, Jr. . | |
| 5,169,023 | 12/1992 | Heiberg et al. | 220/574 |
| 5,285,996 | 2/1994 | Waller | 248/687 |
| 5,419,454 | 5/1995 | Stowell et al. | 220/574 |
| 5,423,452 | 6/1995 | Tardif . | |
| 5,634,617 | 6/1997 | Morris | 248/152 |

MIXING BOWL SUPPORTING ASSEMBLY

This application is a Continuation-in-Part (CIP) of application Ser. No. 08/405,760 filed on Mar. 20, 1995, now U.S. Pat. No. 5,639,617.

BACKGROUND OF THE INVENTION

The invention relates to a supporting assembly for stabilizing bowls while mixing the contents in the bowl.

Typically, when preparing food, mixing is often desirable or required. Conventionally, materials are placed in a mixing bowl and the bowl is set upon the kitchen counter-top. The user then grasps the bowl firmly with one hand so as to hold the bowl stationary while the contents of the bowl are mixed with the other hand. During mixing it is often difficult to hold the mixing bowl securely with only one hand. Further, since one hand is required to hold the bowl, and the other hand is used in mixing, no hand is free to perform any other desired tasks, such as adding ingredients during mixing.

Accordingly, a need exists to provide a supporting assembly for stabilizing bowls while mixing the contents thereof, thereby minimizing the requirement that the user hold the bowl.

SUMMARY OF THE INVENTION

An object of the present invention is to fulfill the need referred to above. In accordance with the principles of the present invention, this and other objectives are obtained by providing a supporting assembly for a mixing bowl including a support having first and second opposing edges and at least one open end defining an interior space. First and second holding members are provided with each holding member covering at least a portion of a respective edge of the support. The holding members have a high coefficient of friction and are constructed and arranged such that when the supporting assembly is disposed with the first holding member in contact with a planar surface and a mixing bowl is at least partially disposed in the interior space with the second holding member contacting a peripheral surface of the mixing bowl, friction between the mixing bowl and the second holding member and between the planar surface and the first holding member holds the bowl stationary with respect to the planar surface when contents of the mixing bowl are mixed.

In accordance with another aspect of the invention, a method is provided for holding a mixing bowl stationary during mixing contents of the bowl using a supporting assembly. The supporting assembly includes a support having first and second opposing edges and at least one open end defining an interior space, and first and second holding members, each holding member covering at least a portion of an associated edge of the support. The method includes placing the supporting assembly on a planar surface such that the first holding member is frictionally engaged with the planar surface. Thereafter, a mixing bowl is placed in the interior space such that a peripheral surface of the mixing bowl frictionally engages the second holding member thereby preventing movement of the bowl while the contents of the bowl are mixed.

Another object of the present invention is the provision of an apparatus of the type described, which is simple in construction, effective in operation and economical to manufacture and maintain.

Other objects, features and characteristics of the present invention, as well as the methods of operation and function of the related elements of the structure, and the combination of the parts and economies of manufacture, will become more apparent upon consideration of the following detailed description and appended claims with reference to the accompanying drawings, all of which form a part of this specification.

DETAILED DESCRIPTION OF THE INVENTION

Figure 1:
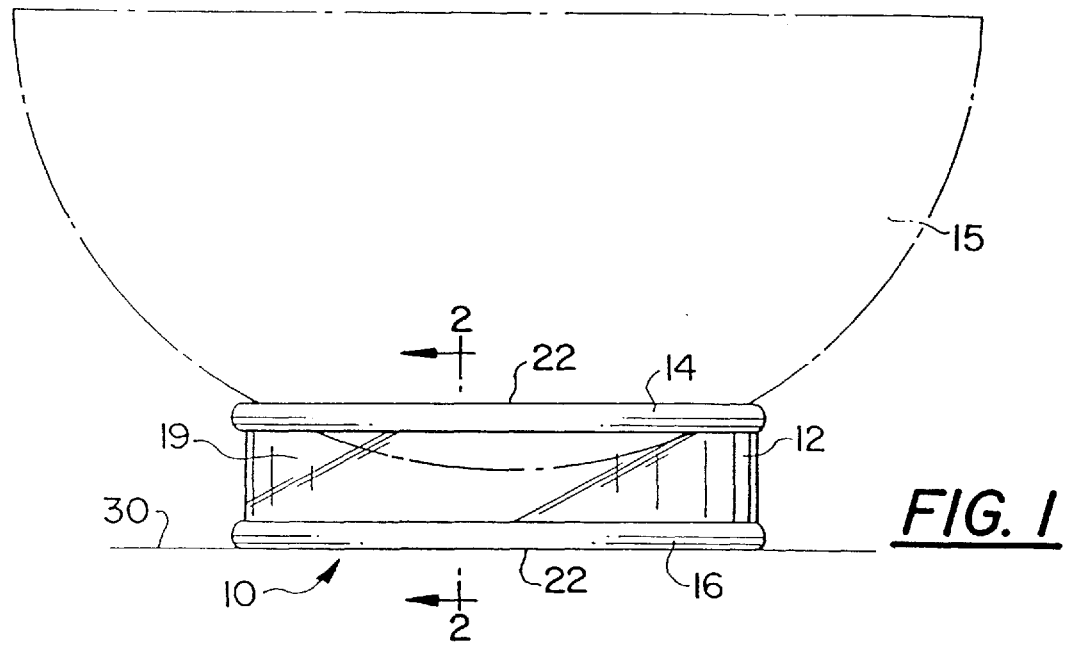
FIG. 1 is a side view of a supporting assembly provided in accordance with the principles of the present invention, shown supporting a mixing bowl.

Referring now to the drawings, a supporting assembly is shown, generally indicated at 10, which embodies the principles of the present invention. The supporting assembly 10 includes a support 12 and a pair of holding members 14, 16 covering opposing edges of the support 12.

The support 12 is a generally cylindrical ring member constructed and arranged to support the weight of a mixing bowl 15. The support 12 has two open ends 17, 18 defining an interior space 19 therebetween. The open ends 17, 18 may be of a generally circular configuration; however, different embodiments of the support may be constructed so as to give the open ends 17, 18 any of a variety of shapes. Only one end of the support 12 needs to be opened to receive a mixing bowl, as will become apparent below. However, to reduce material and cost, in the illustrated embodiment, both ends of the support 12 are open.

The support 12 may be constructed of any material suitable for supporting the weight of a conventional mixing bowl, such as plastic, elastomer, metal, or wood material. In the illustrated embodiment, the support 12 is comprised of clear plexiglass material having an overall diameter of approximately 5.5 inches and a thickness of approximately 0.25 of an inch. It can be appreciated that the dimensions are not critical and are only provided by way of example. The support may be sized and configured to accommodate any mixing bowl.

Figure 2:
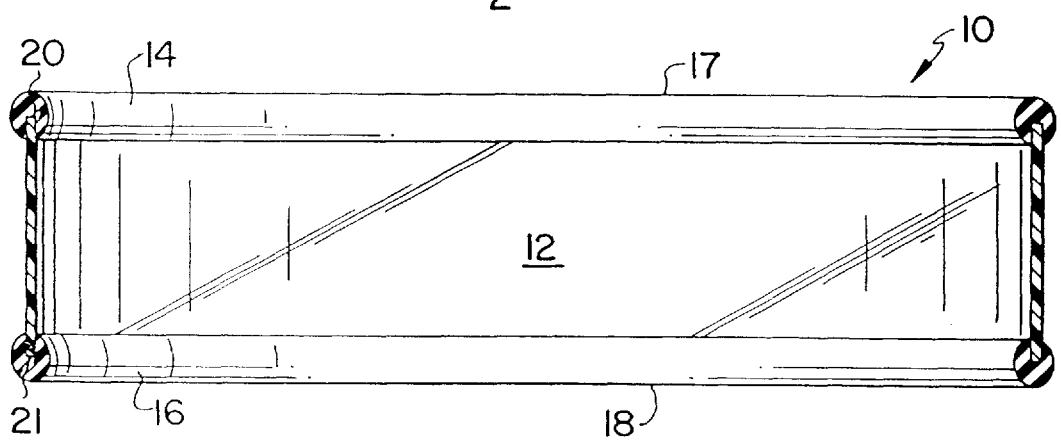
FIG. 2 is a cross-sectional view of the supporting assembly taken along the line 2—2 of FIG. 1.

As shown in FIG. 2, the support 12 has opposing parallel edges 20 and 21. In the illustrated embodiment, the edges are planar. It can be appreciated that the edges 20, 21 may be rounded or beveled if desired to improve ease of assembly of the holding members 14, 16, which will become apparent below.

One holding member 14, 16 is associated with a respective edge 20, 21 of the support 12. In the illustrated embodiment, the holding members 14, 16 are configured identically and cover the entire circumferential edges of the support 12. However, the edges of the support need not be completely covered; portions of the edges need only be covered. For example, each holding member may comprise a plurality of individual sections covering portions of the edges. Sections spaced periodically about a circumferential edge of the support is within the contemplation of the invention.

As shown in FIG. 2, each of the holding members 14, 16 is preferably a linear, extruded member comprised of a resilient material having a high coefficient of friction, such as neoprene, silicone rubber or any other suitable material. Each of the holding members 14, 16 has a rounded outer peripheral surface 22 defining a contact surface. However, this surface 22 need not be rounded, but may be of the desired configurations suitable to frictionally engage an associated surface, as will become apparent below. Holding members 14, 16 having a textured or ribbed contact surface are within the contemplation of the invention.

Figure 3:
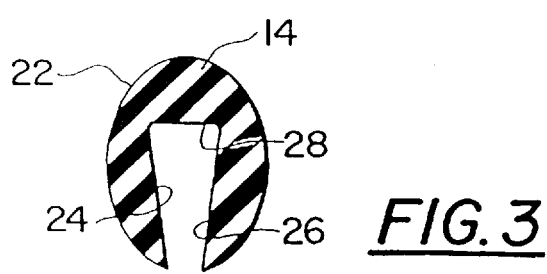
FIG. 3 is an enlarged cross-sectional view of a holding member of the invention.

As best shown in FIG. 3, each holding member 14, 16 includes a generally U-shaped channel 24 therein which is constructed and arranged to frictionally engage the edges 20, 21 of the support 12. The channel 24 is narrower near the open end 26 than at the base 28 thereof to ensure a tight frictional engagement with the edges of the support 12. In the illustrated embodiment, the holding members 14, 16 are fixedly secured to the edges 20, 21. The holding members 14, 16 may be secured by adhesive or the like. It is further within the contemplation of the invention that the holding members 14, 16 may be integrally formed with the support member 12. However, it can be appreciated that the holding members 14, 16 may be attached so as to be easily removable from the edges 20, 21, and thus facilitate cleaning of the holding members 14, 16 together with the support 12.

Figure 4:
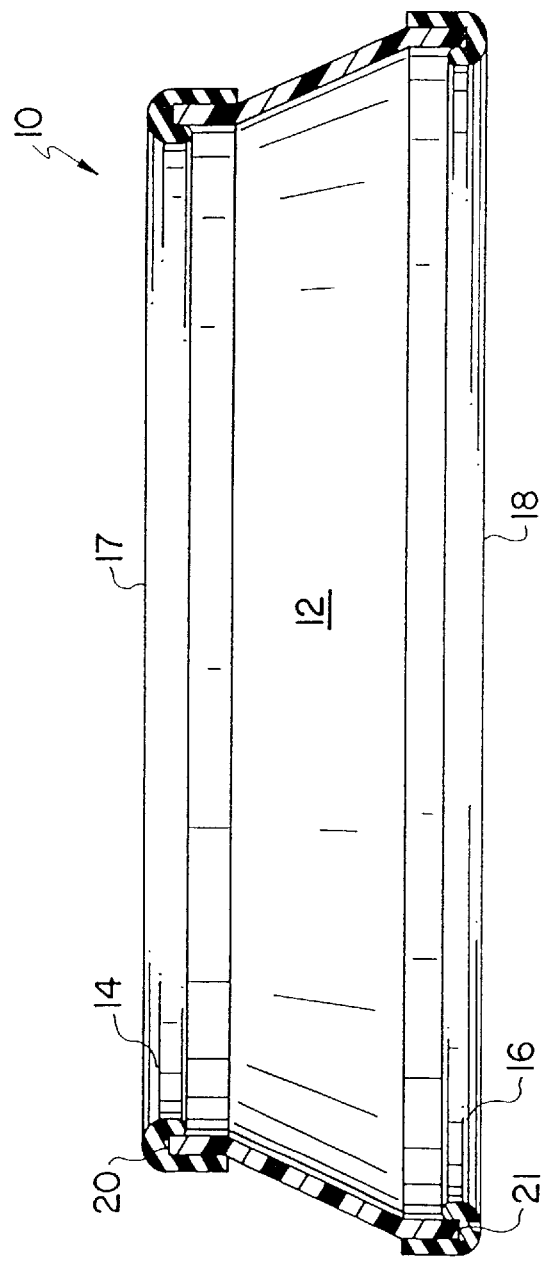
FIG. 4 is a cross-sectional view of an alternative embodiment of the supporting assembly provided in accordance with the principles of the present invention.

FIG. 4 shows an alternative embodiment of the support assembly 10 wherein the generally cylindrical support 12 is configured such that the open ends 17, 18 are of unequal size with respect one to the other.

As noted above, in the illustrated embodiment, the holding members 14, 16 may be formed separately by an extrusion process and then either removably or fixedly secured to the edges of the support 12. It is within the contemplation of the invention to form the holding members in a variety of ways, for example, the edges of the support may be dipped in a material having a high coefficient of friction when cured so that the material covers a desired portion of the respective edge of the support. It is also within the contemplation of the invention to form the holding members 14, 16 during the molding process of the support 12 such that the holding members 14, 16 are integrally formed and thereby fixedly secured to the support 12.

Figure 5:
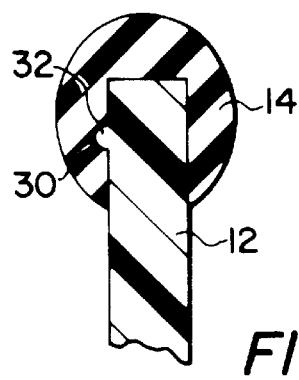
FIG. 5 is a fractional, cross-sectional views of an alternative configuration of the holding members and associated contacting portions of the support member of the supporting assembly provided in accordance with the principles of the present invention.
Figure 6A:
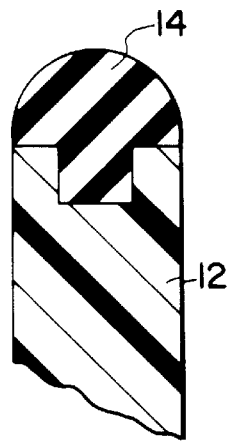
FIGS. 6a–6e are fractional, cross-sectional views of alternative configurations of the holding members and associated contacting portions of the support member of an alternative embodiment of the supporting assembly provided in accordance with the principles of the present invention.
Figure 6B:
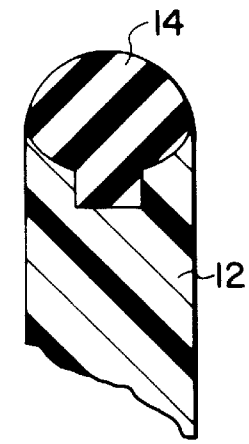
Figure 6C:
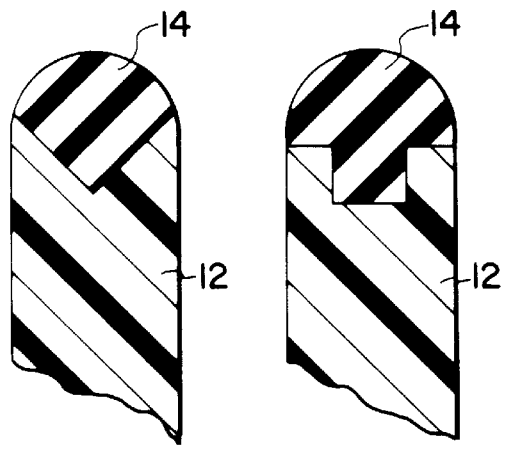
Figure 6D:
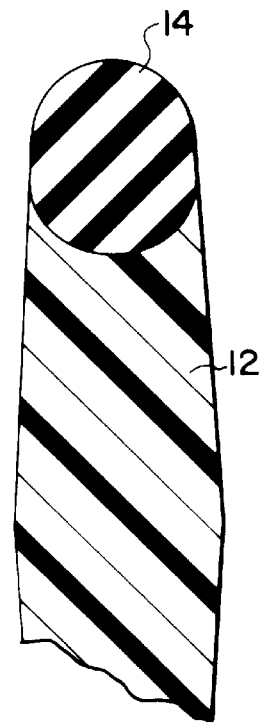
Figure 6E:
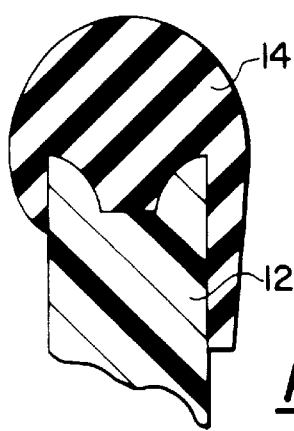

FIG. 5 shows a fractional, cross-sectional view of the upper portion of one side of an alternative embodiment of the invention. The side walls of the U-shaped channel 24 of each of the holding members 14 can be formed to have at least one annular groove 30. The annual groove 30 may alternatively be formed on one or both side walls of the U-shaped channel 24. At least one corresponding annular ridge 32, sized and configured to securely fit within the at least one annular groove 30 of the holding members 14 may be formed on the sidewalls of the support 12. It will be appreciated that the opposite configuration to the above is also within the contemplation of the invention wherein the annular ridge 32 can be formed on the side walls of the U-shaped channel 24 and the corresponding annular groove 30 can be formed on the adjacent portions of the support 12. It is also understood that the embodiment as shown in the fractional, cross-sectional drawing of FIG. 5 can also be configured with a similar holding member 16 and similar sidewall of the support 12 for the lower portion of the support assembly 10.

FIGS. 6a–6e show alternative configurations of holding members 14, 16 and the associated contacting portions of the support 12 which can be used with an alternative embodiment of the present invention. As shown in FIGS. 6a–6d, the holding members 14, 16 can be alternatively formed in one of several configurations and can be fixedly secured by overmolding to a correspondingly configured edge 20, 21 of the support 12. The overmolding process can be performed as part of the initial molding process for the support 12 or can be sequentially performed as a separate molding step. The different configurations of holding members 14, 16 and the corresponding edges 20, 21 shown in FIGS. 6a–6e are representative of a wide variety of possible shapes which are within the contemplation of the invention and which could be employed to provide a secure contact between the holding members 14, 16 and the corresponding edges 20, 21.

The use of the device will be appreciated with reference to FIG. 1. As shown, contact surface 22 of holding member 16 is in contact with a planar surface 30 such as a countertop, and the mixing bowl 15 is at least partially disposed in the interior space 19 of the support 12 such that the contact surface 22 of the second or opposing holding member 14 is contacting the outer peripheral surface of the bowl 15. It can be appreciated that the bowl 15 need not be vertically oriented within the device, as illustrated. The bowl may be tilted within the device for ease in mixing, so long as the outer peripheral surface of the bowl 15 is in contact with surface 22 of the second holding member. In this position, frictional forces generated between the bowl 15 and the second holding member 14 and between the planar surface 30 and the first holding member 16 hold the bowl 15 stationary with respect to the planar surface 30, when the contents of the bowl are mixed. Thus, beating, whisking or stirring of the contents of the bowl 15 can be performed by the preparer using only one hand to accomplish the task.

It can be appreciated that the objects of the invention have been fully and effectively accomplished, it will be realized, however, that the foregoing preferred embodiment has been shown and described for the purpose of illustrating the structural and functional principles of the present invention and are subject to change without departure from such principles. Therefore, this invention includes all modifications encompassed within the spirit of the following claims.

What is claimed is:

1. A supporting assembly for a mixing bowl comprising:

a support having first and second opposing free end edges and open ends defining a continuous interior space between said open ends; and first and second holding members, each holding member having a coefficient of friction greater than that of said support, said first and second holding members being fixedly secured to and covering, in overlapping relation, at least a portion of said first and second edges of said support respectively, each holding member being constructed and arranged such that when said supporting assembly is disposed with said first holding member in contact with a planar surface and a mixing bowl is at least partially disposed in said interior space with said second holding member contacting a peripheral surface of the mixing bowl, friction alone, between said mixing bowl and said second holding member and between said planar surface and said first holding member holds said bowl stationary with respect to said planar surface when contents of said mixing bowl are mixed.

2. The supporting assembly according to claim 1, wherein said open ends are of unequal size with respect one to the other.

3. The supporting assembly according to claim 1, in combination with a mixing bowl, said mixing bowl being constructed and arranged such that when a portion thereof is disposed within said interior space of said support, said second holding member contacts an outer peripheral surface of said mixing bowl.

4. The supporting assembly according to claim 1, wherein each of said holding members covers an entire respective edge of said support.

5. The supporting assembly according to claim 1, wherein said first and second edges are planar.

6. The supporting assembly according to claim 1, wherein said support comprises a material selected from the group consisting of plastics, elastomers, metals or woods.

7. The supporting assembly according to claim 1, wherein said holding members are comprised of silicone.

8. The supporting assembly according to claim 1, wherein said holding members are comprised of neoprene.

9. The supporting assembly according to claim 1, wherein said holding members each have a rounded outer peripheral surface defining a contact surface.

10. The supporting assembly according to claim 1, wherein said holding members each have a textured peripheral outer surface defining a contact surface.

11. A supporting assembly for a mixing bowl comprising:
a support having first and second opposing free end edges and open ends defining a continuous interior space between said open ends; and
first and second holding members, each holding member having a coefficient of friction greater than that of said support, said first and second holding members covering, in overlapping relation, at least a portion of said first and second edges of said support respectively, said first and second holding members each having at least one annular groove adjacent to and interacting with a corresponding at least one annular ridge protruding outwardly from said support, each holding member being constructed and arranged such that when said supporting assembly is disposed with said first holding member in contact with a planar surface and a mixing bowl is at least partially disposed in said interior space with the second holding member contacting a peripheral surface of the mixing bowl, friction alone, between said mixing bowl and said second holding member and between said planar surface and said first holding member holds said bowl stationary with respect to said planar surface when contents of said mixing bowl are mixed.

12. A method of holding a mixing bowl stationary during mixing contents of the bowl using a supporting assembly, said supporting assembly comprising a support in the form of a generally cylindrical ring having first and second opposing edges and open ends defining a continuous interior space between said open ends, and first and second holding members, each holding member having a coefficient of friction greater than that of said support, said first and second holding members being fixedly attached to and covering, in overlapping relation, at least a portion of said first and second edges of said support respectively; said method comprising:

placing said supporting assembly on a planar surface such that said first holding member is frictionally engaged with said planar surface; and
placing a mixing bowl in said interior space such that a peripheral surface of said mixing bowl frictionally engages said second holding member thereby preventing movement of said bowl while said contents of said bowl are mixed.

13. A mixing bowl system comprising:
a mixing bowl; and
a supporting assembly comprising:
a support in the form of a generally cylindrical ring having first and second opposing free end edges and at least one open end defining an interior space; and
first and second holding members each holding member having a coefficient of friction greater than that of said support, the first and second holding members being fixedly secured to and covering, in overlapping relation, at least a portion of the first and second edges of said support respectively, each holding member being constructed and arranged such that when said supporting assembly is disposed with said first holding member in contact with a planar surface and said mixing bowl is at least partially disposed in said interior space with the second holding member contacting a peripheral surface of the mixing bowl, friction alone, between the mixing bowl and the second holding member and between the planar surface and the first holding member, holds the bowl stationary with respect to the planar surface when contents of the mixing bowl are mixed.

14. A supporting assembly for a mixing bowl comprising:
a support in the form of a generally cylindrical ring having interior and exterior surfaces and opposing first and second edges at open free ends of the support, an interior space being defined between said ends; and
first and second holding members, each holding member having a greater coefficient of friction than that of said support, the first and second holding members being fixedly engaged with the interior and exterior surfaces at a respective end of said support so as to cover, in overlapping relation, at least a portion of the first and second edges of said support respectively, each holding member being constructed and arranged such that when said supporting assembly is disposed with said first holding member in contact with a planar surface and a mixing bowl is at least partially disposed in said interior space with the second holding member contacting a peripheral surface of the mixing bowl, friction alone, between the mixing bowl and the second holding member and between the planar surface and the first holding member, holds the bowl stationary with respect to the planar surface when contents of the mixing bowl are mixed.

15. A supporting assembly for a mixing bowl comprising:
a support having first and second opposing free end edges and open ends defining a continuous interior space between the open ends; and
first and second holding members, each holding member covering, in overlapping relation, at least a portion of the first and second edges of said support respectively, each holding member being constructed and arranged such that when said supporting assembly is disposed with said first holding member in contact with a planar surface and a mixing bowl is at least partially disposed in said interior space with the second holding member contacting a peripheral surface of the mixing bowl, friction alone, between the mixing bowl and the second holding member and between the planar surface and the first holding member, holds the bowl stationary with respect to the planar surface when contents of the mixing bowl are mixed, wherein said support is generally cylindrical ring having opposing open ends defining said interior space therebetween, and wherein each of said holding members includes surfaces defining a channel therein sized to fixedly secure an associated edge of said support.

16. The supporting assembly according to claim 15, wherein said each of said holding members covers an entire respective edge of said support.

* * * * *